US011977436B2

(12) United States Patent
Patel et al.

(10) Patent No.: US 11,977,436 B2
(45) Date of Patent: May 7, 2024

(54) SYSTEMS AND METHODS FOR MANAGING HIGH-SPEED DATA LINKS

(71) Applicant: Dell Products, L.P., Round Rock, TX (US)

(72) Inventors: Bhavesh Govindbhai Patel, Austin, TX (US); Arun Chada, Pflugerville, TX (US); Bhyrav M. Mutnury, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 16 days.

(21) Appl. No.: 17/813,788

(22) Filed: Jul. 20, 2022

(65) Prior Publication Data

US 2024/0028437 A1    Jan. 25, 2024

(51) Int. Cl.
*G06F 11/07*    (2006.01)
*G06F 13/42*    (2006.01)

(52) U.S. Cl.
CPC ........ *G06F 11/0772* (2013.01); *G06F 11/076* (2013.01); *G06F 13/4221* (2013.01)

(58) Field of Classification Search
CPC . G06F 11/0772; G06F 11/076; G06F 13/4221
USPC .......................................................... 714/48
See application file for complete search history.

(56) References Cited

U.S. PATENT DOCUMENTS

2021/0391973 A1\* 12/2021 Jeon .......................... G06F 1/08

\* cited by examiner

*Primary Examiner* — Yair Leibovich
(74) *Attorney, Agent, or Firm* — Fogarty LLP

(57) ABSTRACT

Systems and methods are provided for management of PCIe bandwidth within an IHS (Information Handling System). A PCIe connection is detected between a first of the processors of the IHS and a solid-state drive accessed via a DPU (Data Processing Unit). In a processor core of the DPU (e.g., ARM core) buffers are initialized for tracking specific types of errors in the PCIe connection. Upon detecting an error in the PCIe connection, the error is added to one of the designated buffers based on a type of the detected error. If adding of the error in the PCIe connection to the buffer results in a size limit of the buffer being reached, and if the size of the buffer cannot be reduced through retransmission of the errors in the buffer, a transmission speed of the PCIe connection is downgraded, thus extending operations at higher transmission speeds.

20 Claims, 4 Drawing Sheets

SYSTEMS AND METHODS FOR MANAGING HIGH-SPEED DATA LINKS

FIELD

The present disclosure relates generally to Information Handling Systems (IHSs), and relates more particularly to the management of data-link bandwidth that is available within an IHS.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS may utilize various protocols and standards for communicating with internal components of the IHS and with the external components and systems that may be connected to an IHS. PCIe (Peripheral Component Interconnect Express) is a high-bandwidth input/output (I/O) interface or data bus that is used by IHSs as a communication mechanism. Because of its high-speed data transmission capabilities, PCIe is used as a communication interface for many types of components, including graphics cards, network cards, removable processor cores, streaming multimedia devices, USB cards and certain types of storage devices. PCIe may also be used for establishing direct high-speed connections between IHSs that are in close proximity to each other and are configured as a computing cluster, such as in an enterprise data center implementation. PCIe connections may also be used for establishing high-speed data connections in support of specialized configurations of IHSs, such as in support of artificial intelligence and machine learning systems.

PCIe devices typically interface with one or more PCIe buses provided by an IHS. A PCIe bus connection is logically organized into data pathways referred to as lanes, where each lane consists of two differential pairs of signaling wires. One of the differential pairs of each lane is used for transmission of PCIe data and the other differential pair is used for receiving PCIe data. In server applications, common PCIe connections include eight lane (x8), sixteen lane (x16) and thirty-two lane (x32) connections. Various other bandwidth PCIe connections may be supported by an IHS based on the types of PCIe devices and components that are supported by the IHS. PCIe supports the grouping of multiple lanes into higher bandwidth PCIe connections that may be referred to as links. The greater the number of lanes within link, the higher the bandwidth of the link. For instance, within an x32 PCIe bus, the lanes may be grouped into four x8 bandwidth PCIe links, two x16 bandwidth PCIe links, etc.

Each PCIe link may be configured to operate at multiple different speeds, with lower transmission speeds PCIe links being utilized to mitigate the effects of errors in the transmission of data via the PCIe links. An IHS may include one or more SSDs (Solid State Devices) that may be used as storage resources available for use by components of the IHS. The NVMe (Non-Volatile Memory Express) protocol specifies interfaces for accessing SSDs via PCIe connections, thus improving the ability to utilize multiple SSDs in parallel and at high-bandwidths. An SSD that supports NVMe may be connected to an IHS via a PCIe link, where the bandwidth of this PCIe link is based on the number of lanes in the PCIe link and also based on the transmission speed utilized by the lanes in the PCIe link.

SUMMARY

In various embodiments, IHSs (Information Handling Systems) include: one or more processors utilizing one or more PCIe (Peripheral Component Interconnect Express) buses that connect to a plurality of PCIe switches; the PCIe switches connected to the one or more processors via the PCIe busses; a plurality of solid-state drives; a data processing unit (DPU) comprising: one or more DPU processor cores; a PCIe interface comprising a plurality of upstream ports connecting the data processing unit to the PCIe switch and a plurality of downstream ports connecting the data processing unit to the plurality of solid-state drives; one or more memory devices comprising a plurality of buffers and storing computer-readable instructions that, upon execution by the one or more DPU processor cores, cause a PCIe bandwidth management process to: detect an initiation of a PCIe connection between a first of the processors of the IHS and a first of the solid-state drives, wherein the PCIe connection is supported by the PCIe switches; initialize one or more of the buffers for tracking errors in the PCIe connection, wherein each initialized buffer is designated for tracking a specific type of error in the PCIe connection; upon detecting an error, add the error in the PCIe connection to a first of the designated buffers based on a type of the error; determine whether the adding of the error in the PCIe connection to the first buffer results in a size limit of the first buffer being reached; and when the size of the first buffer cannot be reduced through retransmission of the errors added to the first buffer, downgrade a transmission speed of the PCIe connection.

In additional IHS embodiments, the one or more processors comprise removeable graphical processing units (GPUs) that are coupled to the IHS via the one or more PCIe buses. In additional IHS embodiments, the removeable GPUs are configured to access data stored in the one or more solid state drives via the PCIe switch. In additional IHS embodiments, the GPUs retrieve video data from the solid-state drives for use in training of machine learning algorithms operating on the GPUs. In additional IHS embodiments, the first buffer is designated for tracking correctable errors in the PCIe connection. In additional IHS embodiments, a second of the buffers is designated for tracking non-correctable errors in the PCIe connection. In additional IHS embodiments, the error limit of the first buffer is greater in size than the error limit of the second buffer. In additional IHS embodiments, execution of the program instructions by the DPU processor cores further causes the PCIe bandwidth management process to periodically empty the buffers initialized for tracking correctable errors in the PCIe connection. In additional IHS embodiments, adding the error in the PCIe connection to the first buffer comprises storing one or more PCIe packets associated with the error to the first buffer. In additional IHS embodiments, the size of the error limit of the first buffer is selected based on whether data is retrieved from the solid-state drives via the PCIe connection for use by machine learning algorithms.

In various embodiments, methods are provided for management of PCIe (Peripheral Component Interconnect Express) bandwidth of an IHS (Information Hand ling System). The methods may include: detecting an initiation of a PCIe connection between one or more processors of the IHS and a solid-state drive that is accessible via a PCIe switch of the IHS; initializing one or more of the buffers in a memory device of a data processing unit (DPU) installed in the IHS, wherein the buffers are designated for tracking errors in the PCIe connection, wherein each initialized buffer is designated for tracking a specific type of error in the PCIe connection; upon detecting an error in the PCIe connection, adding the detected error in the PCIe connection to a first of the designated buffers based on a type of the error; determining whether the adding of the error to the first buffer results in a size limit of the first buffer being reached; and when the size of the first buffer cannot be reduced through retransmission of the errors stored in the first buffer, downgrading a transmission speed of the PCIe connection.

In additional method embodiments, the one or more processors comprise removeable graphical processing units (GPUs) that are coupled to the IHS via the one or more PCIe buses. In additional method embodiments, the first buffer is designated for tracking correctable errors in the PCIe connection. In additional method embodiments, a second of the buffers is designated for tracking non-correctable errors in the PCIe connection. In additional method embodiments, the error limit of the first buffer is greater in size than the error limit of the second buffer. In additional method embodiments, adding the error in the PCIe connection to the first buffer comprises storing one or more PCIe packets associated with the error to the first buffer.

In various embodiments, a computer-readable storage device of a DPU (data processing unit) includes instructions stored thereon for management of PCIe (Peripheral Component Interconnect Express) bandwidth of an IHS (Information Handling System) in which the DPU is installed. Execution of the instructions by one or more processors of the DPU causes the processors of the DPU to: detect an initiation of a PCIe connection between one or more processors of the IHS and a solid-state drive that is accessible via a PCIe switch of the IHS; initialize one or more of the buffers in a memory device of the DPU, wherein the buffers are designated for tracking errors in the PCIe connection, wherein each initialized buffer is designated for tracking a specific type of error in the PCIe connection; upon detecting an error in the PCIe connection, add the detected error in the PCIe connection to a first of the designated buffers based on a type of the error; determine whether the addition of the error to the first buffer results in a size limit of the first buffer being reached; and when the size of the first buffer cannot be reduced through retransmission of the errors stored in the first buffer, downgrade a transmission speed of the PCIe connection.

In some DPU storage device embodiments, the first buffer is designated for tracking correctable errors in the PCIe connection, a second of the buffers is designated for tracking non-correctable errors in the PCIe connection. In additional DPU storage device embodiments, the error limit of the first buffer is greater in size than the error limit of the second buffer.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
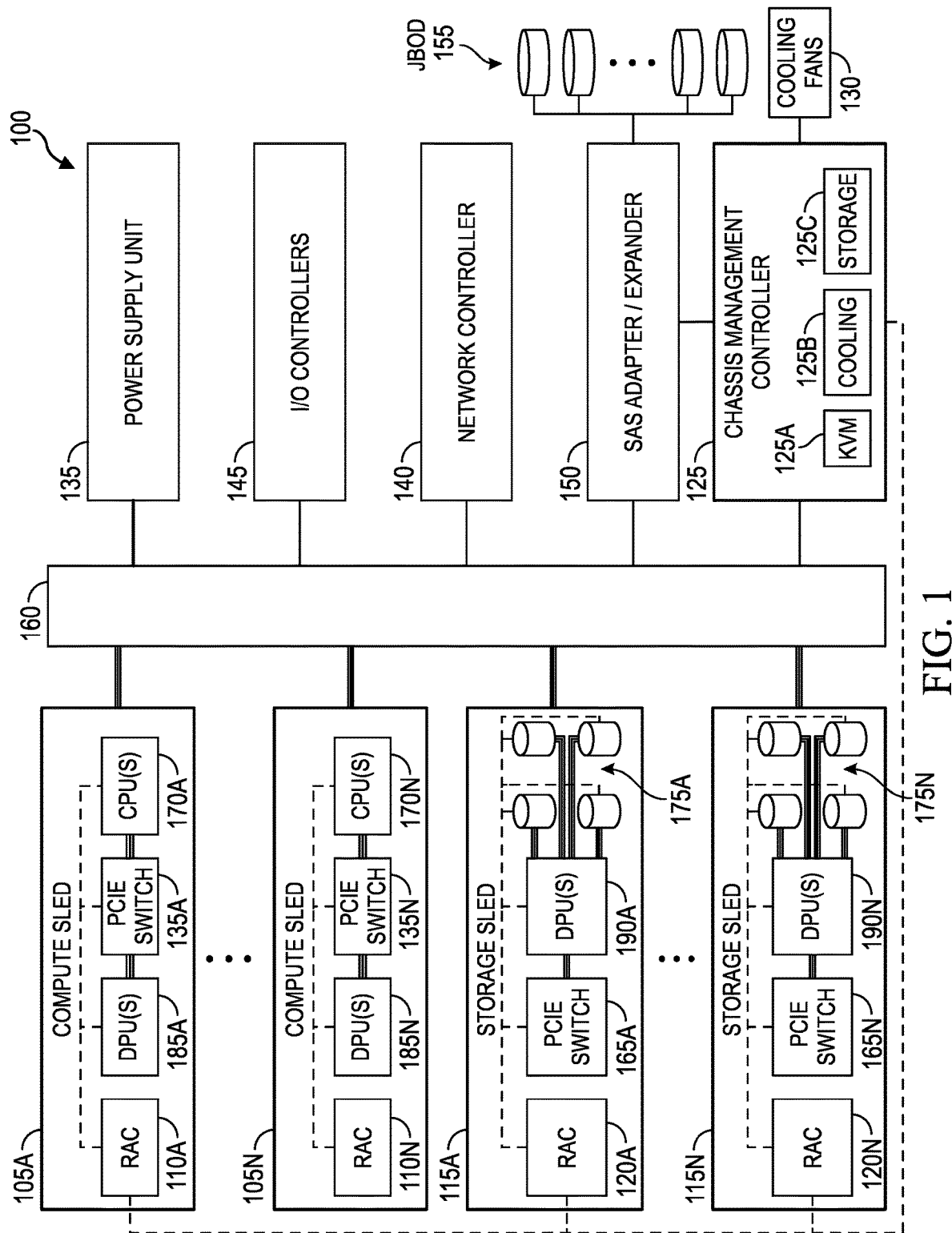
FIG. 1 is a diagram illustrating certain components of a chassis configured, according to some embodiments, for management of data-link bandwidth that is available within IHSs installed in the chassis.

FIG. 1 is a block diagram illustrating certain components of a chassis 100 comprising one or more compute sleds 105*a-n* and one or more storage sleds 115*a-n* that may be configured to implement the systems and methods described herein for management of data-link bandwidth that is available within IHSs installed in chassis 100. Embodiments of chassis 100 may include a wide variety of hardware configurations in which one or more IHS 105*a-n*, 115*a-n* are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removeable IHSs 105*a-n*, 115*a-n* that are installed in the chassis.

Chassis 100 may include one or more bays that each receive an individual sled (that may be additionally or alternatively referred to as a tray, blade, and/or node) IHSs, such as compute sleds 105*a-n* and storage sleds 115*a-n*. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in many cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as some computational tasks utilized in some artificial intelligence systems, may utilize computational and/or storage resources that are shared within an IHS, within a chassis 100 and/or within a set of IHSs that may be spread across multiple chassis of a data center. In some artificial intelligence systems, processing tasks may be allocated for processing to a specific processing unit of an IHS, such as to a DPU 185a-n, 190a-n that is a supplementary processor that operates separate from the one or more main CPUs of an IHS. Implementing such artificial intelligence systems while spanning processing components of one or more IHSs is aided by high-speed data links between these processing components, such as the illustrated PCIe connections that may be used in forming a PCIe fabric that is implemented by PCIe switches 135a-n, 165a-n installed in these IHSs 105a-n, 115a-n.

Chassis 100 may be installed within a rack structure that provides at least a portion of the cooling utilized by the Hs 105a-n, 115a-n installed in chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
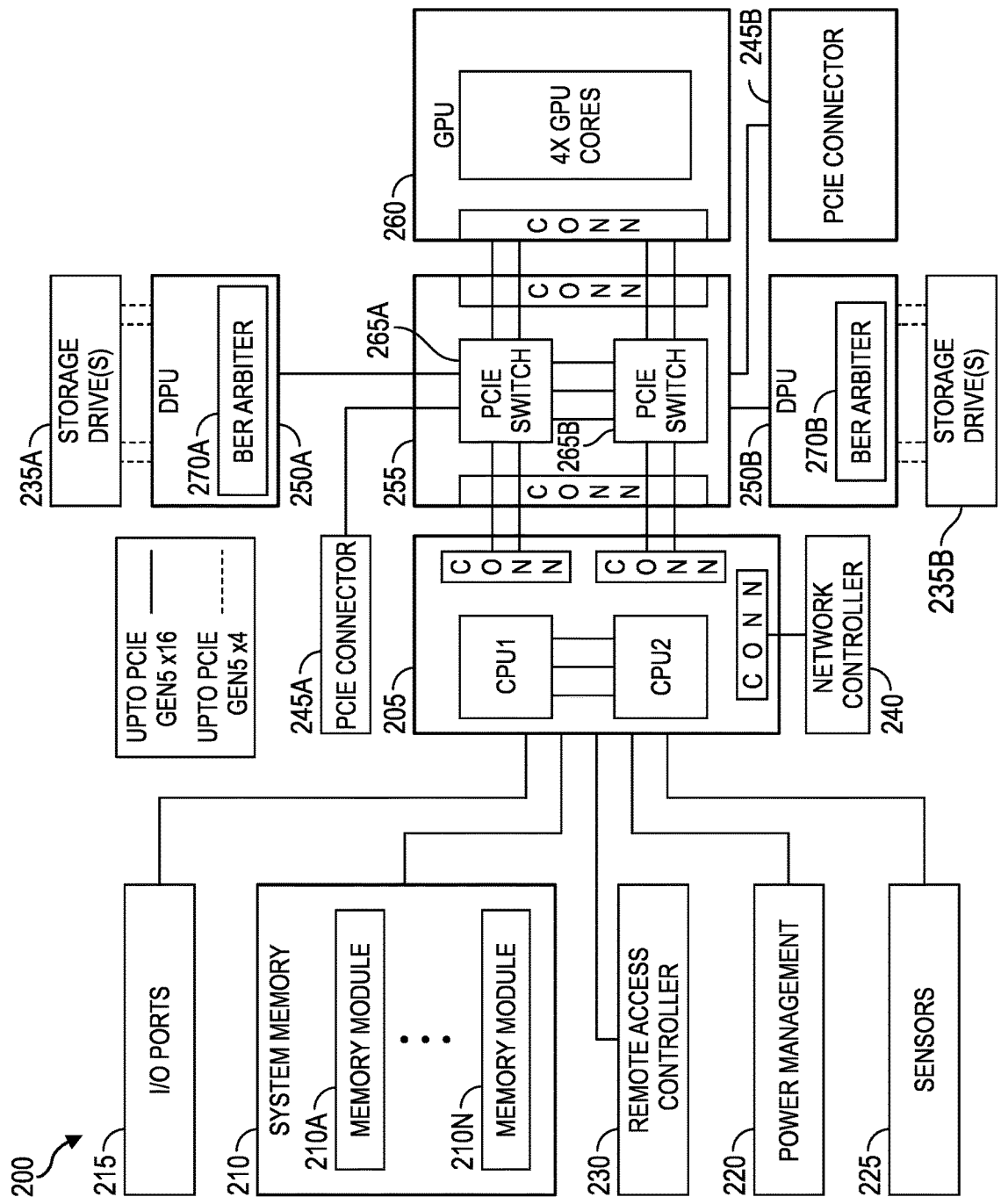
FIG. 2 is a diagram illustrating certain components of an IHS configured, according to some embodiments, for management of data-link bandwidth that is available within the IHS.

In certain embodiments, each individual sled 105a-n, 115a-n-n may be an IHS such as described with regard to IHS 200 of FIG. 2. Sleds 105a-n, 115a-n may individually or collectively provide computational processing resources that may be used to support a variety of e-commerce, multimedia, business and scientific computing applications, such as artificial intelligence systems provided via cloud computing implementations. Sleds 105a-n, 115a-n are typically configured with hardware and software that provide leading-edge computational capabilities. Accordingly, services provided using such computing capabilities are typically provided as high-availability systems that operate with minimum downtime. As described in additional detail with regard to FIG. 2, sleds 105a-n, 115a-n may be configured for general-purpose computing or may be optimized for specific computing tasks.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n. In support of these monitoring and management functions, remote access controllers 110a-n may utilize both in-band and sideband (i.e., out-of-band) communications with various components of a respective sled 105a-n and chassis 100. Remote access controllers 110a-n, 120a-n may collect various types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n that utilize sideband bus connections with various internal components of the respective sleds 105a-n, 115a-n.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, accessed through a PCIe switch 165a-n by a respective DPU 190a-n of the IHS, where use of the DPU in this manner provides low-latency and high-bandwidth access to the SSDs. Use of NVMe supported by PCIe couplings further supports high-bandwidth and low-latency use of multiple SSDs in parallel. The immense data storage and retrieval capabilities provided by such implementations are best harnessed by offloading storage operations to a DPU 190a-n, and thus without burdening the main CPU of an IHS.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein for management of data-link bandwidth that is available within IHS 200. It should be appreciated that although the embodiments described herein may describe an IHS that is a compute sled or similar computing component that may be deployed within the bays of a chassis, other embodiments may be utilized with other types of IHSs that may also support management of data-link bandwidth that is available within the IHS. In the illustrative embodiment of FIG. 2, IHS 200 may be a computing component, such as sled 105a-n, 115a-n or other type of server, such as an 1RU server installed within a 2RU chassis, that is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately assigned computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated that is located on the same die as the CPU 205. Each memory controller may be configured to manage the transfer of data to and from a system memory 210 of the IHS, in some cases using a high-speed memory interface. The system memory 210 is coupled to CPUs 205 via one or more memory buses that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of busses. For instance, CPUs 205 may also be coupled to a power management unit 220 that may interface with a power system of the chassis 100 in which IHS 200 may be installed. CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 230 that supports remote management of IHS 200 and of various internal components of IHS 200. In certain embodiments, remote access controller 230 may operate from a different power plane from the CPUs 205 and from other components of IHS 200, thus allowing the remote access controller 230 to operate, and management tasks to proceed, while the processing cores of IHS 200 are powered off. As described, various functions provided by the BIOS, including launching the operating system of the IHS 200, may be implemented by the remote access controller 230. In some embodiments, the remote access controller 230 may perform various functions to verify the integrity of the IHS 200 and its hardware components prior to initialization of the operating system of IHS 200 (i.e., in a bare-metal state).

Remote access controller 230 may include a service processor, or specialized microcontroller, that operates management software that provides remote monitoring and administration of IHS 200. Remote access controller 230 may be installed on the motherboard, backplane, midplane, etc. of IHS 200, or may be coupled to IHS 200 via an expansion slot connector provided the IHS. In support of remote monitoring functions, remote access controller 230 may include a dedicated network adapter that may support management connections by remote access controller 230 using wired and/or wireless network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 230 may support monitoring and administration of various managed devices of an IHS via a sideband bus interface. For instance, messages utilized in device management may be transmitted using I2C sideband bus connections that may be established with each of the managed devices. These managed devices of IHS 200, such as specialized hardware, network controllers 240, sensors 225, and storage drives 235*a-b*, may be connected to the CPUs 205 via in-line buses, such as the described PCIe switch fabric, that is separate from the I2C sideband bus connections used by the remote access controller 230 for device management.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., connection of a motherboard, backplane, midplane, etc.) of IHS 200. In some embodiments, network controller 240 may support high-bandwidth network operations through a PCIe coupling accessible by the chipsets by CPUs 205.

As indicated in FIG. 2, in some embodiments, CPUs 205 may be coupled to a PCIe card 255 that includes two PCIe switches 265*a-b* that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265*a-b*, different embodiments may operate using different numbers of CPUs and PCIe switches. In addition to serving as I/O controllers that route PCIe traffic, PCIe switches 265*a-b* include switching logic that can be used to expand the number of PCIe connections that are supported by CPUs 205. PCIe switches 265*a-b* may multiply the number of PCIe lanes available to CPUs 205, thus allowing more PCIe devices to be connected to CPUs 205, and for the available PCIe bandwidth to be allocated with greater granularity. In some instances, the switching logic of PCIe switches 265*a-b* that is used to route PCIe transmissions are connected to CPUs 205 via upstream ports and are connected to PCIe devices via downstream ports that multiply the number of upstream ports, thus distributing the available PCIe bandwidth of the upstream ports to the downstream ports. The PCIe bandwidth that is available in each of these downstream ports may be configured through allocating one or more PCIe lanes to a specific port and also by specifying a transmission speed for the port, such as 16 Gbps, 32 Gbps, 64 Gbps. As described in additional detail below, PCIe switches 265*a-b* may also implement error reporting, including the generation of error reports that specify failures in TLP processing for the PCIe connections being supported by the PCIe switches 265*a-b*. In existing systems, such errors detected by PCIe switches may be used in determining the transmission speed for a PCIe connection. In such systems, transmission speeds are typically lowered until errors in the PCIe connection drop below a certain threshold.

As illustrated, PCIe switches 265*a-b* are each coupled via PCIe connections to a respective DPU 250*a-b*, that may be a coupled to the IHS via a removeable card that couples to a PCIe connector of the IHS. Each of the DPUs 250*a-b* includes a programmable processor that can be configured for offloading functions from CPUs 205. In some instances, DPUs 250*a-b* may be programmed to offload functions that support the operation of devices or systems that are coupled to IHS 200, thus sparing CPUs 205 from a significant number of interrupts required to support these devices coupled to the IHS and gaining efficiency through the use of specialized implementations of these offloaded functions that can be achieved using the programmable logic of the DPUs 250*a-b*.

In some embodiments, DPUs 250*a-b* may include a plurality of programmable processing cores and/or hardware accelerators, that may be used to implement functions used to support devices coupled to the IHS 200. In the illustrated embodiment, DPUs 250a-b implement functions used to support storage drives 235a-b, such as SSDs (solid-state drives). For instance, DPUs 250a-b may implement processing of PCIe communications with SSD storage drives 235a-b that support NVMe protocols that support the use of high-bandwidth PCIe connections with SSDs. DPUs 250a-b may also include one more memory devices that may be used to store program instructions executed by the processing cores and/or used to support the operation of SSD storage drives 235a-b, such as in implementing cache memories and buffers utilized in support of the storage drives.

In some embodiments, the processing cores of DPUs 250a-b include ARM (advanced RISC (reduced instruction set computing) machine) processing cores. In other embodiments, the cores of DPUs 250a-b may include MIPS (microprocessor without interlocked pipeline stages) cores, RISC-V cores, or CISC (complex instruction set computing) (i.e., x86) cores. Each core of the DPUs 250a-b may be programmed to perform functions that support operation of SSD storage drives 235a-b, such as processing of PCIe packets that are transmitted in executing read, write and other I/O operations on these storage drives 235a-b. In some embodiments, DPUs 250a-b may be implemented through integrated circuits mounted on a printed circuit board (e.g., a replaceable card) that is coupled to the motherboard, backplane, midplane or other printed circuit board of the IHS. In some embodiments, PCIe busses may be utilized both in the couplings connecting DPUs 250a-b to the IHS 200 and in the couplings connecting the DPUs 250a-b to the SSD storage drives 235a-b. In other embodiments, DPUs 250a-b may implement operations in support of other types of devices and may similarly manage high-bandwidth PCIe connections with these devices. For instance, in various embodiments, DPUs 250a-b may manage high-bandwidth connections, such as PCIe connections, with networking devices in implementing functions of a network switch, compression and codec functions, virtualization operations or cryptographic functions.

As indicated in FIG. 2, DPUs 250a-b each include a bit-error-rate (BER) arbiter 270a-b. As described, high-bandwidth connections, such as PCIe links, may be configured with regard to the number of lanes that are included in a PCIe link and with regard to the transmission speeds that are utilized be each of the individual lanes of a PCIe link. Embodiments provide mechanisms for managing the bandwidth that is available via these high-bandwidth connections utilized by DPUs 250a-b. In particular, each of the arbiters 270a-b generates and manages buffers, such as using the described memory devices supported by DPUs 250a-b, in order to track various types of errors reported in the transmission of PCIe packets to and from the DPUs 250a-b in support of the SSD storage drives 235a-b. Based on the number and types of errors routed to each of these buffers, the respective arbiters 270a-b may configure the transmission speeds for use by each of the PCIe lanes that are supported by the DPUs 250a-b.

In addition to supporting high-bandwidth PCIe couplings with DPUs 250a-b, as illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200.

Rather than being used for rendering graphics data for display, GPUs 260 may instead be used in processing of graphics data, such as in support of artificial intelligence and machine learning systems. For instance, GPUs 260 may be used in processing graphical inputs from video and/or camera feeds being utilized in support of machine vision systems. In some instances, GPUs 260 may process streaming video data in support of on-the-fly machine vision evaluation of live captured video, where captured video data and data resulting from the processing of the video data by the GPUs 260 may be stored to SSD storage drives 235a-b via PCIe lanes implemented by PCIe switches 265a-b. In other instances, GPUs 260 may be utilized in offline processing of video data, such as for training of machine learning systems. In such instances, the video data may be retrieved from SSD storage drives 235a-b and transmitted to GPUs 260 for processing, also via PCIe lanes implemented by PCIe switches 265a-b. Embodiments may additionally or alternatively used in the offloading and acceleration of various types of computational workloads other than in the processing of video data.

As illustrated in FIG. 2, PCIe switches 265a-b may support PCIe connections in addition to those utilized by GPUs 260 and DPUs 250a-b, where these connections may include PCIe links of one or more lanes. For instance, PCIe connectors 245a-b supported by printed circuit board of IHS 200 may allow various other systems and devices to be coupled to IHS. Through couplings to PCIe connectors 245a-b, a variety of data storage devices, graphics processors and network interface cards may be coupled to IHS 200.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
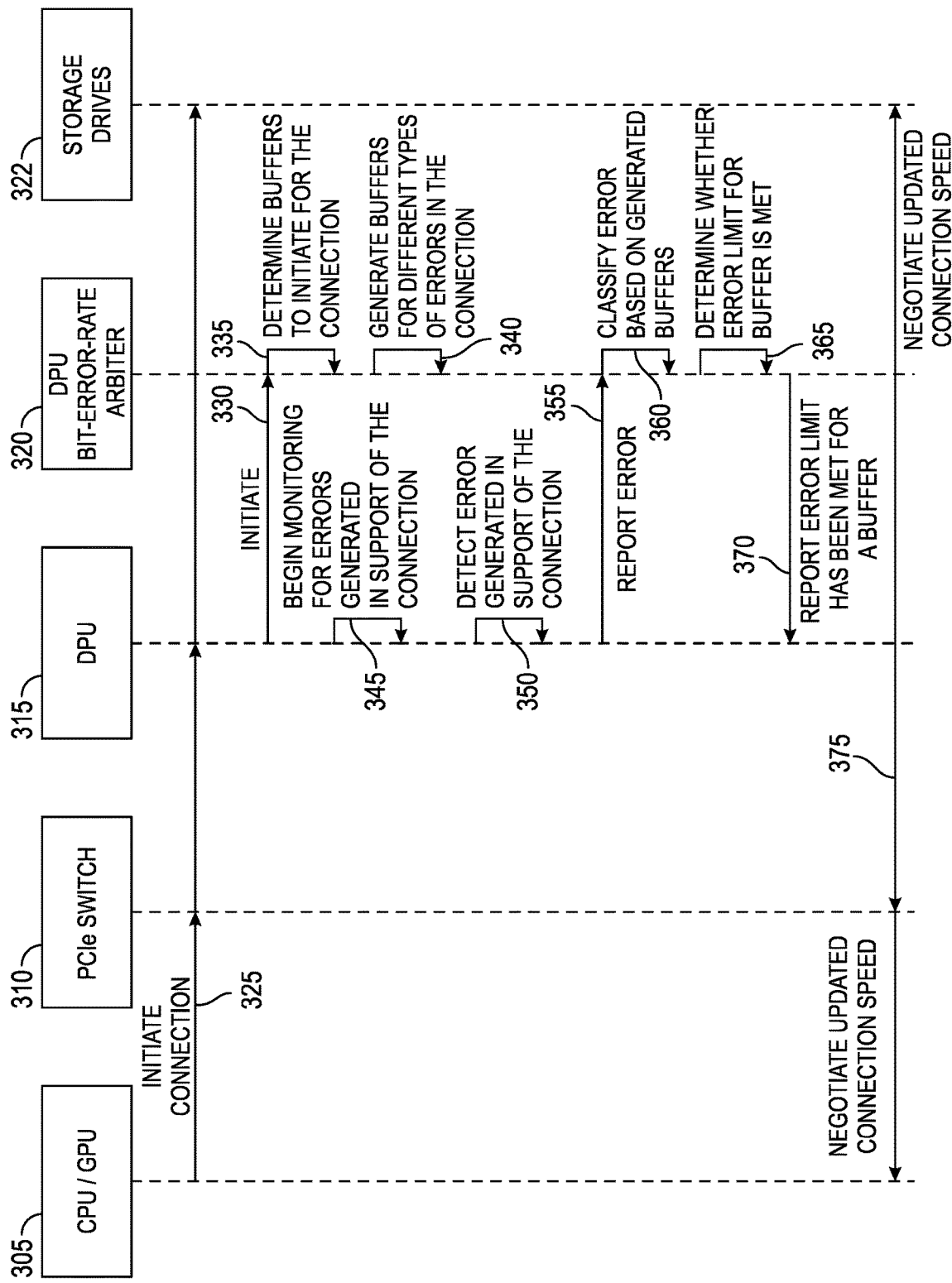
FIG. 3 is a swim lane diagram illustrating certain responsibilities of components of an IHS configured according to certain embodiments for management of data-link bandwidth that is available within an IHS.
Figure 4:
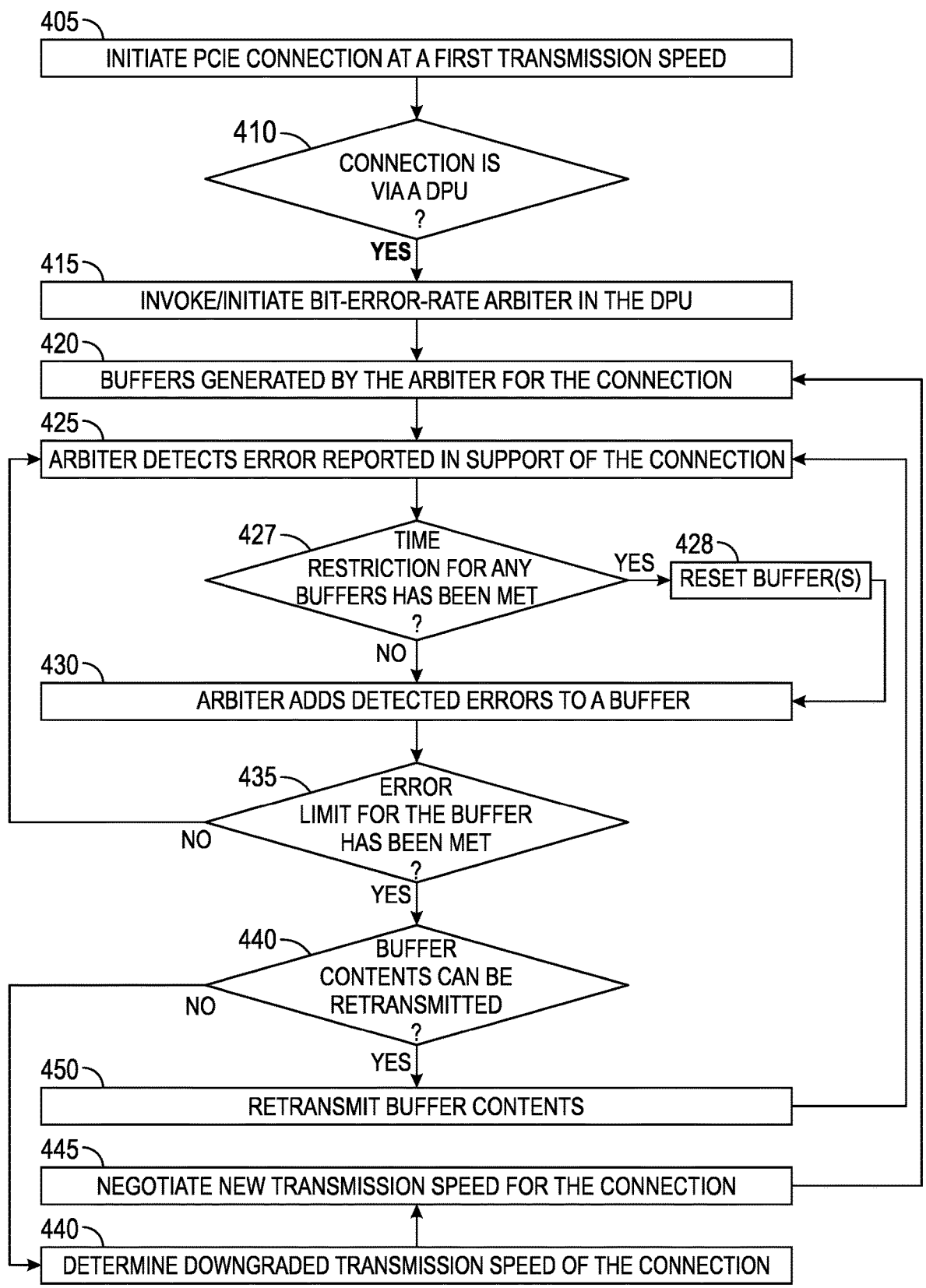
FIG. 4 is a flowchart describing certain steps of a method, according to some embodiments, for management of data-link bandwidth that is available within an IHS.

FIG. 3 is a swim lane diagram illustrating certain responsibilities of components of a system configured according to certain embodiments for management of data-link bandwidth that is available within an IHS. As described with regard to FIG. 2, embodiments may include an IHS that includes one or more CPUs/GPUs 305, PCIe switches 310, DPUs 315, which each include a bit-error-rate arbiter 320, and storage drives 322, such as SSD drives. FIG. 4 is a flowchart describing certain steps of a method, according to some embodiments, for operation of these components of an IHS in the management of data-link bandwidth that is available within an IHS.

Some embodiments of the method of FIG. 4 may begin, at block 405, with the initiation, at 325 of the system of FIG. 3, of a PCIe connection by CPU/GPU 305 of the IHS with one or more storage drives 322 of the IHS, where this connection is established via a PCIe switch 310 and a DPU 315. As described with regard to FIG. 2, a processing component of an IHS, such as a GPU, may be used in support of artificial intelligence and machine learning algorithms, such as in the processing of video data that is stored and/or retrieved from one or more SSDs, where data may be stored and retrieved from the SSDs using high-bandwidth PCIe connections that are brokered by a DPU. As indicated in FIG. 4, initiation of such a PCIe connection includes selection of a transmission speed for this connection between the CPU/GPU 305 and the storage drives 322, where this speed is selected to provide that maximum bandwidth that is supported by a PCIe coupling between the CPU/GPU 305, storage drives 322, PCIe switch 310 and DPU 315.

At 410, embodiments may evaluate whether the initiated connection is managed by a DPU 315 that supports the described management of PCIe bandwidth. If the DPU 315 supports the described management of PCIe bandwidth, at 415 and 330, the DPU 315 initiates the operation of a bit-error-rate (BER) arbiter 320 process. As described above, a DPU 315 may be include programmable logic components, such as one or more ARM cores, and memory devices capable of storing program instructions and data for used by the logic components. Utilizing these capabilities of DPU 315, embodiments initiate a BER arbiter 320 that is a program that operates on an ARM core, or other logic unit, of the DPU 315. If the BER arbiter 320 is already running, it is invoked in response to the initiation of a new PCIe connection that is supported by the DPU 315.

In response to the initiated PCIe connection, at 335, the BER arbiter 320 determines a set of buffers to be generated in support of the new PCIe connection. In existing bandwidth management systems, the transmission speed of a PCIe connection may be determined based on the rate of errors (i.e., the bit-error-rate) observed in the PCIe connection. In instances where the error rate rises above a specified threshold, the transmission speed of a PCIe connection is reduced, in these existing bandwidth management systems. In embodiments, on the other hand, the buffers generated by the BER arbiter 320 are utilized to evaluate the errors observed in the PCIe connection and to defer any downgrading of the PCIe connection speed until further efforts are made address the observed errors. Accordingly, at 335, the BER arbiter 320 determines a set of buffers to be created for use in tracking the errors observed in the PCIe connection.

Through use of multiple buffers for tracking errors in a single PCIe connection, embodiments support improved granularity in management of PCIe connection speeds. As described, embodiments may be used in live applications of machine learning systems, such as in on-the-fly analysis of captured video data and may also be used in offline training of these machine learning systems. Through use of the described buffers by embodiments, greater tolerance for errors may be specified for PCIe connections supporting live applications of machine learning systems, thus accepting greater errors in order to maintain use of faster connection speeds and thus without having to downgrade the capabilities of the machine learning system. Smaller tolerances for PCIe errors may be specified, according to embodiments, for offline training of machine learning systems, since improved accuracy may be preferred over faster operations during training of these systems. In some embodiments, tolerances may be selected based on characteristics of the machine learning system, such as based on the size of the machine learning algorithm in use by that system. For instance, a larger buffer, and thus larger tolerance, may be configured for a neural network utilizing nine layers and a smaller tolerance will be configured for a neural network utilizing three layers, on the basis that a larger model will be better able to compensate for any missing data that is never delivered.

In some instances, the buffers that will be created by the BER arbiter 320 may be a standard set of buffers, where a separate buffer is created for each type of error that may be reported by the PCIe connection. In other instances, the buffers created by the BER arbiter 320 may be based on characteristics of the PCIe connection. For example, in the described artificial intelligence and machine learning scenarios, PCIe connections between CPU/GPU 305 and SSD storage devices 322 may be used in processing of video data, such as in the retrieval of video data for use in training of machine learning systems. In such instances, certain types of PCIe errors may be more commonly observed in these applications. In addition, different types of applications may exhibit different tolerances for different types of errors. For instance, live processing of captured video data may be designed to account for incomplete data, thus providing significant tolerance for errors in the transmission of data.

Embodiments may utilize error limits for each buffer in specifying a tolerance for the designated type of error for that buffer. For example, error limits may be set relatively high for buffers instantiated in support of live processing of captured video data by machine learning system, while error limits may be much lower for offline training of machine learning systems, even when using this same captured video data. In some embodiments, the error limits for a buffer may be additionally or alternatively selected based on the designated type of error for that buffer. For instance, the error limit for a buffer designated for correctable PCIe transmission errors may be significantly higher than the error limit for a buffer designated for non-correctible errors.

Once the quantity and settings for the buffers for the new PCIe connection have been determined, at 340 and 420, the BER arbiter 320 generates the buffers for tracking the errors related to the new PCIe connection. In some embodiments, the BER arbiter 320 may utilize memory devices of the DPU 315, such as a cache memory of the DPU, in implementing the buffers. As illustrated in FIG. 3, upon initiation of the new PCIe connection, at 345, the DPU 315 begins monitoring for errors in this PCIe connection. In some instances, the errors may be detected directly by the DPU 315 and may thus result from the transmission of PCIe packets between the CPU/GPU 305 and the storage drives 322. In some instance, the errors may be reported by the storage drives 322. In some instances, the errors may be reported directly in the PCIe packets that are received by the DPU 315. In some instances, errors may be determined through monitoring of registers maintained by the PCIe interfaces used by the PCIe switch 310, DPU 315, CPU/GPU 305 and/or storage drives 322.

With error monitoring initiated, at 350 and 425, the DPU 315 detects an error that has been generated in support of the PCIe connection and reports the error to the BER arbiter 320. At 360, the BER arbiter 320 classifies and stores the error according to the buffers that are being maintained for tracking errors in this specific PCIe connection. For instance, the PCIe packets associated with a correctable error may be stored to a buffer designated for correctable errors. In some instances, PCIe packets associated with non-correctable, non-fatal errors in the PCIe connection may be stored to one designated buffer when the error reports a malformed PCIe packet, and the packets associated with the error are stored to a different buffer when the error reports a completion timeout for the packet. Separate buffers for these types of PCIe errors may allow for different tolerances to be specified for each type, thus prolonging the ability to maintain operations at the current transmission speed of the PCIe connection. Whereas malformed PCIe packets may not be addressed by embodiments, timeout errors may be addressed through retransmissions, thus warranting higher error limits for such buffers.

Once the packers for a detected error have been stored to a buffer, as indicated at 365, some embodiments may continue by determining whether the error limit has been met for that buffer. As described, each buffer that is generated and maintained by the BER arbiter 320 may have an associated error limit that specifies a maximum size for the buffer before corrective actions are initiated, such as adjusting the transmission speed of the PCIe connection. Also as described, the error limit for each buffer may be selected in part based on the type of error to which the buffer has been designated and/or based on the type of computing task in which the PCIe connection is being utilized. Accordingly, at 365, the BER arbiter 320 determines whether the error limit for the buffer has been met based on the detected error being stored to that buffer.

As indicated in FIG. 4, in some embodiments, each of the buffers for a PCIe connection may be evaluated and possibly emptied prior to storing a detected error in this PCIe connection to one of these buffers. For instance, at 427, the BER arbiter 320 may determine whether a time limit (e.g., 30 seconds, 60 seconds, 1 minute, etc.) has been met for any or all of the buffers that are being maintained for a PCIe connection. If an interval greater than this time limit has elapsed since the last time the buffer was emptied, at 428, the BER arbiter 320 proceeds to empty this buffer, such as by flushing the ARM core cache used to implement this buffer. In some embodiments, rather than emptying the buffer, the BER arbiter 320 may instead delete all entries in the buffer that are older than the time limit. Through such managing of these buffers for a PCIe connection, the BER arbiter 320 ensures the buffers reflect the current operating state of the PCIe connection, while allowing a certain tolerance for errors in this PCIe connection, without prematurely downgrading the transmission speed for the PCIe connection. Once the buffers for a PCIe connection have been refreshed by the BER arbiter 320, at 430, the reported error is stored to the appropriate buffer maintained for the PCIe connection, and at 435, and the BER arbiter 320 determines whether storing of the error to the buffer results in the error limit for the buffer being exceeded.

If the error limit for the buffer is not exceeded, the BER arbiter 320 continues monitoring for errors reported in support of the PCIe connection and the transmission speed of the PCIe connection is left unchanged. Operating in this manner, errors are tracked by the BER arbiter 320, while allowing a configurable tolerance for different types of errors before downgrading the transmission speed of the PCIe connection, where any downgrading of the transmission speed would restrict the I/O capabilities of computational tasks, such as artificial intelligence and machine learning workloads, operating on CPU/GPU 305.

In instances where the error limit for a buffer is exceeded by the storing of the detected error to this buffer and where the buffer is being used for storing of correctable errors, at 440, the BER arbiter 320 may attempt to reduce the size of the buffer by correcting some or all of the errors in the buffer. For instance, where the buffer has been designated for time-out errors, at 450, the packets that have been stored to the buffer may be resent. In instances where the buffer has been designated for errors reported by the storage drive 322 (i.e., PCIe receiver errors), at 450, the packet may be resubmitted to the storage drive, such as repeating a read request that previously failed due to a correctable parity error. If the buffer contents can be re-transmitted or otherwise removed from the buffer, operations continue, at 425, with the continued monitoring of errors in the PCIe connection and without the transmission speed of the PCIe connection being downgraded or otherwise altered, thus preserving the current performance capabilities of the PCIe connection and the algorithms operating on the CPU/GPU 305 that are utilizing this connection.

As illustrated in FIG. 4, if the buffer has reached its error limit and the buffer contents cannot be re-sent or otherwise addressed, at 440, embodiments may determine a downgraded transmission speed for the PCIe connection. In some embodiments, at 370, the BER arbiter 320 notifies the DPU 315 of the error limit on a buffer for the PCIe connection being reached, such that downgrading of the transmission speed of the PCIe connection is warranted. At 375 and 445, the DPU 315 negotiates a downgraded transmission speed for the PCIe connection, where the negotiation may utilize inputs from the storage drives 322 and/or the CPU/GPU 305 that is utilizing the PCIe connection. In some embodiments, the transmission speed may be downgraded to the next slowest transmission speed that is supported (e.g., downgrading from a 32 Gbps transmission speed for the PCIe connection to 16 Gbps). In some embodiments, the transmission speed for the entire PCIe connection between the CPU/GPU 305, PCIe switch 310, DPU 315a and storage drives 322 may be downgraded. However, in instances where the buffers indicate that only a single storage drive coupled to the DPU 315 is exhibiting errors, in some embodiments, only the PCIe link between the DPU 315 and that particular storage drive is downgraded with regards to its transmission speed. This potentially isolates a problematic storage drive, while allowing full bandwidth utilization of the other storage drives being supported by the DPU 315 and being used by algorithms operating on the CPU/GPU 305.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
one or more processors utilizing one or more PCIe (Peripheral Component Interconnect Express) buses that connect to a plurality of PCIe switches;
the PCIe switches connected to the one or more processors via the one or more PCIe buses;
a plurality of solid-state drives;
a data processing unit (DPU) comprising:
one or more DPU processor cores;
a PCIe interface comprising a plurality of upstream ports connecting the data processing unit to the PCIe switches and a plurality of downstream ports connecting the data processing unit to the plurality of solid-state drives;
one or more memory devices comprising a plurality of buffers and storing computer-readable instructions that, upon execution by the one or more DPU processor cores, cause a PCIe bandwidth management process to:
detect an initiation of a PCIe connection between a first of the one or more processors of the IHS and a first of the solid-state drives, wherein the PCIe connection is supported by the PCIe switches;
initialize one or more of the buffers for tracking errors in the PCIe connection, wherein each initialized buffer is designated for tracking a specific type of error in the PCIe connection;
upon detecting an error, add the error in the PCIe connection to a first of the designated buffers based on a type of the error;
determine when the adding of the error in the PCIe connection to the first buffer results in a size limit of the first buffer being reached; and
when a size of the first buffer has reached the size limit and the size of the first buffer cannot be reduced through retransmission of the error added to the first buffer, downgrade a transmission speed of the PCIe connection.

2. The IHS of claim 1, wherein the one or more processors comprise removeable graphical processing units (GPUs) that are coupled to the IHS via the one or more PCIe buses.

3. The IHS of claim 2, wherein the removeable GPUs are configured to access data stored in one or more solid state drives via the PCIe switches.

4. The IHS of claim 3, wherein the GPUs retrieve video data from the solid-state drives for use in training of machine learning algorithms operating on the GPUs.

5. The IHS of claim 1, wherein the first buffer is designated for tracking correctable errors in the PCIe connection.

6. The IHS of claim 5, wherein a second of the buffers is designated for tracking non-correctable errors in the PCIe connection.

7. The IHS of claim 6, wherein the size limit of the first buffer is greater in size than a size limit of the second buffer.

8. The IHS of claim 1, wherein execution of the program instructions by the DPU processor cores further causes the PCIe bandwidth management process to periodically empty the buffers initialized for tracking correctable errors in the PCIe connection.

9. The IHS of claim 1, wherein adding the error in the PCIe connection to the first buffer comprises storing one or more PCIe packets associated with the error to the first buffer.

10. The IHS of claim 1, wherein the size limit of the first buffer is selected based on whether data is retrieved from the solid-state drives via the PCIe connection for use by machine learning algorithms.

11. A method for management of PCIe (Peripheral Component Interconnect Express) bandwidth of an IHS (Information Hand ling System), the method comprising:
detecting an initiation of a PCIe connection between one or more processors of the IHS and a solid-state drive that is accessible via a PCIe switch of the IHS;
initializing one or more buffers in a memory device of a data processing unit (DPU) installed in the IHS, wherein the buffers are designated for tracking errors in the PCIe connection, wherein each initialized buffer is designated for tracking a specific type of error in the PCIe connection;
upon detecting an error in the PCIe connection, adding the detected error in the PCIe connection to a first of the designated buffers based on a type of the error;
determining whether the adding of the error to the first buffer results in a size limit of the first buffer being reached; and
when a size of the first buffer has reached the size limit and the size of the first buffer cannot be reduced through retransmission of the errors stored in the first buffer, downgrading a transmission speed of the PCIe connection.

12. The method of claim 11, wherein the one or more processors comprise removeable graphical processing units (GPUs) that are coupled to the IHS via one or more PCIe buses.

13. The method of claim 11, wherein the first buffer is designated for tracking correctable errors in the PCIe connection.

14. The method of claim 13, wherein a second of the one or more buffers is designated for tracking non-correctable errors in the PCIe connection.

15. The method of claim 14, wherein the size limit of the first buffer is greater in size than the size limit of the second buffer.

16. The method of claim 11, wherein adding the error in the PCIe connection to the first buffer comprises storing one or more PCIe packets associated with the error to the first buffer.

17. A non-transitory computer-readable storage device of a DPU (data processing unit) having instructions stored thereon for management of PCIe (Peripheral Component Interconnect Express) bandwidth of an IHS (Information Handling System) in which the DPU is installed, wherein execution of the instructions by one or more processors of the DPU causes the one or more processors of the DPU to:
detect an initiation of a PCIe connection between one or more processors of the IHS and a solid-state drive that is accessible via a PCIe switch of the IHS;
initialize one or more buffers in a memory device of the DPU, wherein the buffers are designated for tracking errors in the PCIe connection, wherein each initialized buffer is designated for tracking a specific type of error in the PCIe connection;

upon detecting an error in the PCIe connection, add the detected error in the PCIe connection to a first of the designated buffers based on a type of the error;

determine whether the addition of the error to the first buffer results in a size limit of the first buffer being reached; and when a size of the first buffer has reached the size limit and the size of the first buffer cannot be reduced through retransmission of the errors stored in the first buffer, downgrade a transmission speed of the PCIe connection.

18. The DPU storage device of claim 17, wherein the first buffer is designated for tracking correctable errors in the PCIe connection.

19. The DPU storage device of claim 18, wherein a second of the one or more buffers is designated for tracking non-correctable errors in the PCIe connection.

20. The DPU storage device of claim 19, wherein the size limit of the first buffer is greater in size than the error size limit of the second buffer.

\* \* \* \* \*

UNITED STATES PATENT AND TRADEMARK OFFICE
CERTIFICATE OF CORRECTION

PATENT NO. : 11,977,436 B2
APPLICATION NO. : 17/813788
DATED : May 7, 2024
INVENTOR(S) : Bhavesh Govindbhai Patel, Arun Chada and Bhyrav M. Mutnury Page 1 of 1

It is certified that error appears in the above-identified patent and that said Letters Patent is hereby corrected as shown below:

In the Claims

In Column 18 Line 16, Claim 11, delete "mation Hand ling System), the method comprising:" and insert --mation Handling System), the method comprising:-- therefor.

In Column 19 Line 22, Claim 20, delete "limit of the first buffer is greater in size than the error size" and insert --limit of the first buffer is greater in size than the size-- therefor.

Signed and Sealed this
Fourth Day of June, 2024

Katherine Kelly Vidal
*Director of the United States Patent and Trademark Office*